US012658744B2

(12) United States Patent
Pocock et al.

(10) Patent No.: US 12,658,744 B2
(45) Date of Patent: Jun. 16, 2026

(54) STATOR WITH CIRCUMFERENTIAL COOLING CHANNELS AND PARALLEL PASSAGES BETWEEN SLOTS

(71) Applicant: Hamilton Sundstrand Corporation, Charlotte, NC (US)

(72) Inventors: Edward Graham Charles Pocock, Birmingham (GB); Andrew E. Page, Tring (GB); Tadashi Sawata, Coventry (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 539 days.

(21) Appl. No.: 18/070,665

(22) Filed: Nov. 29, 2022

(65) Prior Publication Data

US 2023/0170748 A1 Jun. 1, 2023

(30) Foreign Application Priority Data

Nov. 29, 2021 (EP) ..................................... 21275171

(51) Int. Cl.
*H02K 1/20* (2006.01)
*H02K 9/193* (2006.01)
(52) U.S. Cl.
CPC ............... *H02K 1/20* (2013.01); *H02K 9/193* (2013.01)
(58) Field of Classification Search
CPC ............ H02K 3/522; H02K 3/24; H02K 9/22; H02K 9/005; H02K 9/02; H02K 9/04;
(Continued)

(56) References Cited

U.S. PATENT DOCUMENTS 2,074,067 A * 3/1937 Darnell .................... H02K 9/06
310/52
3,610,975 A * 10/1971 Onjanow ................. H02K 9/18
416/93 R
(Continued)

FOREIGN PATENT DOCUMENTS

DE 102016206260 A1 10/2017
EP 1251624 A2 10/2002

OTHER PUBLICATIONS

European Search Report for Application No. 21275171.3, mailed Jul. 4, 2022, 12 pages.

*Primary Examiner* — Maged M Almawri
(74) *Attorney, Agent, or Firm* — CANTOR COLBURN LLP

(57) ABSTRACT

A stator for an electrical machine includes: an annular housing extending around a central axis (X-X); a first circumferential flow channel extending around the housing; a second circumferential flow channel axially spaced from the first circumferential flow channel and extending around the housing; and a plurality of windings. The plurality of windings are circumferentially spaced about the housing to form a passage between each two adjacent windings. Each passage is in fluid communication with both the first circumferential flow channel and the second circumferential flow channel. The first circumferential flow channel is closed to flow at a first circumferential location and the second circumferential flow channel is closed to flow at a second circumferential location, removed from the first circumferential location so as to form a first set of passages (S1) connected in parallel and a second, separate set of passages (S2) connected in parallel.

12 Claims, 8 Drawing Sheets

(58) Field of Classification Search
CPC .. H02K 9/06; H02K 9/08; H02K 9/10; H02K
9/12; H02K 9/14; H02K 9/16; H02K
9/18; H02K 9/19; H02K 5/20; H02K
5/04; H02N 15/00
USPC ........ 310/54, 52, 58, 57, 59, 60, 89, 63, 86,
310/62, 194, 214, 43, 65, 60 A
See application file for complete search history.

(56) References Cited

U.S. PATENT DOCUMENTS

| | | | | |
|---|---|---|---|---|
| 3,761,748 | A * | 9/1973 | Baumann | H02K 9/06 |
| | | | | 310/58 |
| 4,492,885 | A * | 1/1985 | Kitamura | H02K 9/06 |
| | | | | 310/63 |
| 5,258,679 | A * | 11/1993 | Gassmann | H02K 11/33 |
| | | | | 310/194 |
| 6,066,905 | A * | 5/2000 | Wright | H02K 3/20 |
| | | | | 310/260 |
| 6,188,153 | B1 * | 2/2001 | Hokanson | H02K 9/00 |
| | | | | 310/58 |
| 6,515,384 | B1 * | 2/2003 | Kikuchi | H02K 1/20 |
| | | | | 310/58 |
| 6,570,284 | B1 * | 5/2003 | Agnes | H02K 1/185 |
| | | | | 310/156.01 |
| 6,658,721 | B2 * | 12/2003 | Kazama | H02K 15/02 |
| | | | | 310/216.008 |
| 6,700,235 | B1 * | 3/2004 | McAfee | H02K 9/06 |
| | | | | 310/58 |
| 6,784,586 | B2 * | 8/2004 | Akemakou | H02K 21/042 |
| | | | | 310/194 |
| 7,538,457 | B2 * | 5/2009 | Holmes | H02K 9/19 |
| | | | | 310/57 |
| 7,538,467 | B2 * | 5/2009 | Engquist | H02K 1/24 |
| | | | | 310/216.067 |
| 8,013,490 | B2 * | 9/2011 | Hino | H02K 3/522 |
| | | | | 310/194 |
| 8,129,875 | B2 * | 3/2012 | Murata | H02K 3/24 |
| | | | | 310/59 |
| 8,164,225 | B2 * | 4/2012 | Maduskuie | H02K 1/20 |
| | | | | 310/58 |
| 8,179,015 | B2 * | 5/2012 | Nishikawa | H02K 21/044 |
| | | | | 310/263 |
| 8,253,299 | B1 * | 8/2012 | Rittenhouse | B62M 6/90 |
| | | | | 310/257 |
| 8,766,497 | B2 * | 7/2014 | Goto | H02K 5/203 |
| | | | | 310/71 |
| 9,356,492 | B2 * | 5/2016 | Chamberlin | H02K 5/203 |
| 10,756,599 | B2 * | 8/2020 | Yim | H02K 7/006 |
| 11,646,610 | B2 * | 5/2023 | Kim | H02K 3/04 |
| | | | | 310/179 |
| 2002/0149273 | A1 * | 10/2002 | Soitu | H02K 5/203 |
| | | | | 310/58 |
| 2003/0042817 | A1 * | 3/2003 | Tsuneyoshi | H02K 9/197 |
| | | | | 310/216.014 |
| 2004/0155550 | A1 * | 8/2004 | Yamamoto | H02K 13/04 |
| | | | | 310/194 |
| 2004/0222715 | A1 * | 11/2004 | Yamamura | H02K 15/095 |
| | | | | 310/216.015 |
| 2009/0184591 | A1 * | 7/2009 | Hoshino | B60L 3/0061 |
| | | | | 310/60 A |
| 2013/0154397 | A1 * | 6/2013 | Sullivan | H02K 21/22 |
| | | | | 310/68 B |
| 2013/0221770 | A1 * | 8/2013 | Yokogawa | H02K 3/345 |
| | | | | 310/43 |
| 2014/0117794 | A1 * | 5/2014 | Zirin | H02K 9/197 |
| | | | | 165/173 |
| 2015/0028727 | A1 * | 1/2015 | Watanabe | H02K 1/2706 |
| | | | | 310/60 A |
| 2015/0308456 | A1 * | 10/2015 | Thompson | F04D 17/12 |
| | | | | 417/244 |
| 2016/0043604 | A1 * | 2/2016 | Yoshida | H02K 3/325 |
| | | | | 310/71 |
| 2017/0271956 | A1 * | 9/2017 | Hanumalagutti | H02K 3/24 |
| 2020/0153291 | A1 * | 5/2020 | Van Der Wal | H02K 9/193 |
| 2022/0109358 | A1 * | 4/2022 | Tamura | H02P 21/0003 |

* cited by examiner

STATOR WITH CIRCUMFERENTIAL COOLING CHANNELS AND PARALLEL PASSAGES BETWEEN SLOTS

CROSS-REFERENCE TO RELATED APPLICATIONS

This application claims priority to European Patent Application No. 21275171.3 filed Nov. 29, 2021, the entire contents of which is incorporated herein by reference.

TECHNICAL FIELD

The present disclosure relates to electrical machines such as motors and generators and in particular to cooling such machines.

BACKGROUND

Electrical machines such as motors and generators generate heat during operation. As machine sizes increase, the heat generated in the machine increases, meaning that in many machines it is necessary to cool the machine to prevent overheating and also to maintain performance.

The main area of heat generation is in the stator windings and stator core. Some machines use liquid cooling to improve the motor power density. In one example, the stator windings may be directly flooded with a cooling liquid such as oil. However, there is a need to further improve the cooling in electrical machines to improve the thermal performance thereof. This is especially true in some applications such as for example in electric propulsion motors to be used in vehicles such as cars and aircraft.

SUMMARY

According to a first aspect of this disclosure, there is provided a stator for an electrical machine, the stator comprising: an annular housing extending around a central axis; a first circumferential flow channel extending around the housing; a second circumferential flow channel axially spaced from the first circumferential flow channel and extending around the housing; and a plurality of windings, wherein the plurality of windings are circumferentially spaced about the housing to form a passage between each two adjacent windings, wherein each passage is in fluid communication with both the first circumferential flow channel and the second circumferential flow channel, wherein the first circumferential flow channel is closed to flow at a first circumferential location and the second circumferential flow channel is closed to flow at a second circumferential location, removed from the first circumferential location so as to form a first set of passages connected in parallel and a second, separate set of passages connected in parallel, the stator being configured such that coolant flows through the first set of passages from the first circumferential flow channel to the second circumferential flow channel and then flows from the second circumferential flow channel through the second set of passages to the first circumferential flow channel.

The stator according to this aspect of the disclosure provides a first set of passages connected in parallel and a second, separate set of passages connected in parallel, and is configured such that coolant flows through the first set of passages from the first circumferential flow channel to the second circumferential flow channel and then flows from the second circumferential flow channel through the second set of passages to the first circumferential flow channel. Thus, the coolant may flow through the sets of passages so as to balancing the pressure requirements and the thermal requirements of stator cooling.

In some examples, only a single first set of passages and a single second set of passages may be provided. In any example of the disclosure however, the first circumferential flow channel may be closed to flow at a plurality of first circumferential locations and/or the second circumferential flow channel may be closed to flow at a plurality of the second circumferential locations so as to form one or a plurality of first sets of passages connected in parallel which alternate with one or a plurality of second, separate sets of passages connected in parallel. This may allow further balancing of the pressure requirements and the thermal requirements of stator cooling for any given stator design.

The first and/or second circumferential flow channels may be closed to flow in a number of ways. For example, the housing may be configured to close the first and/or second circumferential flow channels to flow at any desired location. In any example of the disclosure however, the stator may further comprise: a first insert configured to close the first circumferential flow channel to flow at the first circumferential location.

In any example of the disclosure, the stator may further comprise: a second insert configured to close the second circumferential flow channel to flow at the second circumferential location.

By providing one or more inserts, it will be understood that the insert(s) may be removed or further inserts may be added such that the circumferential location(s) at which the first and/or second circumferential flow channels are closed to flow may be altered in an existing stator should the cooling requirements or other design parameters for the stator change over time.

In any example of the disclosure, the first and/or second insert may be configured to engage with a respective winding.

In any example of the disclosure, the first and or second insert may include a rough surface for improved sealing engagement with the winding.

In any example of the disclosure, a sealant may be provided between the first and/or second insert and the respective winding.

The windings could be provided in the housing in any desired way. In any example of the disclosure however, the stator may further comprise: a plurality of teeth, each winding extending around a respective toot. By forming the windings around respective teeth, the position and shape of the windings may be determined more accurately.

In some examples, the stator may further comprise a core.

In any example of the disclosure, the core may comprise an annular body extending around the central axis and received within the housing.

In any example of the disclosure, the plurality of teeth may extend radially outwardly or inwardly from the annular body. It will be understood that in such an arrangement, the teeth may be positioned on the core before the windings are formed, thus further improving the accuracy with which the windings may be positioned in the stator.

In any example of the disclosure, the plurality of teeth may form part of the core.

In any example of the disclosure, the first circumferential flow channel may extend between a first axial end of the core and the housing.

In any example of the disclosure, the second circumferential flow channel may extend between a second, opposite axial end of the core and the housing.

In any example of the disclosure, each first set of passages may comprise three passages connected in parallel and each second, separate set of passages may comprise three passages connected in parallel. It will be understood however that each first and second set of passages may comprise any desired number of passages for the cooling arrangement required for a particular stator and that each set of passages may include a different number of passages or some of all of the sets of passages may include a different or the same number of passages as required.

The stator according to the disclosure may be used in any type of electrical machine. From a further aspect of the disclosure therefore, an electrical machine comprising a stator as described in any preceding example may be provided.

From a still further aspect of the disclosure, a method of cooling a stator as in any of the preceding examples or an electrical machine as in any of the preceding examples may be provided, the method comprising flowing coolant through the first and second set(s) of passage(s).

In any example of the disclosure, the method may further comprise flowing the coolant into the first circumferential flow channel before flowing the coolant through the first and second set(s) of passage(s).

From a still further aspect of the disclosure, a method of assembling a stator for an electrical machine is provided, the stator comprising: an annular housing extending around a central axis; a first circumferential flow channel extending around the housing; and a second circumferential flow channel, axially spaced from the first circumferential flow channel and extending around the housing, the method comprising: assembling a plurality of windings, wherein the plurality of windings are circumferentially spaced about the housing to form a passage between each two adjacent windings, wherein each passage is in fluid communication with both the first circumferential flow channel and the second circumferential flow channel; closing the first circumferential flow channel to flow at a first circumferential location; and closing the second circumferential flow channel to flow at a second circumferential location, removed from the first circumferential location so as to form a first set of passages connected in parallel and a second, separate set of passages connected in parallel, such that coolant flows through the first set of passages from the first circumferential flow channel to the second circumferential flow channel and then flows from the second circumferential flow channel through the second set of passages to the first circumferential flow channel.

In any example of the disclosure, the method may comprise closing the first circumferential flow channel to flow at a plurality of first circumferential locations and closing the second circumferential flow channel to flow at a plurality of second circumferential locations so as to form a plurality of first sets of passages connected in parallel which alternate with a plurality of second, separate sets of passages connected in parallel.

In any example of the disclosure, closing the first circumferential flow channel to flow at the or each first circumferential location may comprise inserting an insert into the first circumferential flow channel at the or each first circumferential location, and/or closing the second circumferential flow channel to flow at the or each second circumferential location may comprise inserting an insert into the second circumferential flow channel at the or each second circumferential location.

Features described in relation to one aspect of this disclosure may of course be applied to the further aspects thereof. In general, features of any example described herein may be applied wherever appropriate to any other example described herein. Where reference is made to different examples or sets of examples, it should be understood that these are not necessarily distinct but may overlap.

BRIEF DESCRIPTION OF DRAWINGS

Certain examples of the disclosure will now be described by way of example only and with reference to the accompanying drawings in which.

DETAILED DESCRIPTION

Figure 1:
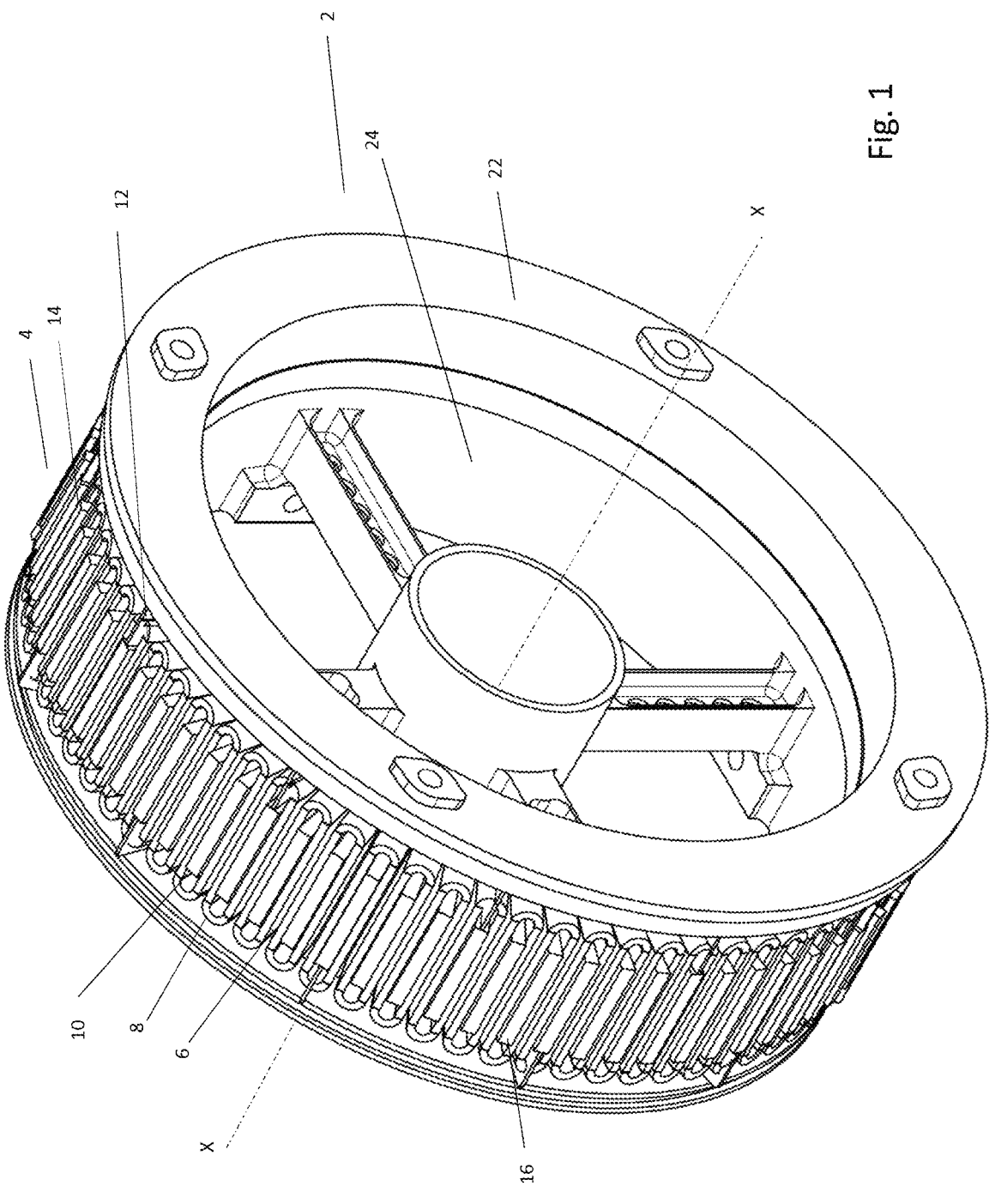
FIG. 1 shows a perspective view of a stator of an electric motor according to the disclosure.

FIG. 1 shows a stator 2 (and housing) of an electrical machine (not shown). In this example, the machine is an electric motor. However, the principles of the disclosure may be applied to other electrical machines, for example generators. The electrical machine will also comprise a rotor (not shown) which may be positioned either radially internally or radially externally of the stator 2. The stator 2 of the example of FIG. 1 is configured to be positioned radially internally of a rotor in an electrical machine.

The stator according to the disclosure may be annular in form and includes a plurality of windings arranged circumferentially about the stator. To achieve high power density in the electrical machine, it is desirable to apply liquid cooling (for example oil cooling) to the stator to remove core losses and copper losses from the windings. According to the disclosure, passages are formed between windings in the stator, such that liquid coolant may be flowed along the passages between the windings.

To provide even cooling of the windings, an even distribution of coolant around the stator is desirable. In some examples of the disclosure, a pump is provided to supply coolant to the stator at a pressure sufficient to cause the coolant to flow through the passages. To reduce the pump capacity required, it is therefore desirable to provide the required level of cooling while keeping the pressure drop in the coolant flowing through the stator to a minimum. By flowing coolant through each passage in series, an even distribution of coolant in the stator may be achieved. However, this will result in a high drop in coolant pressure across the stator with an undesirably high level of energy required to pump the coolant across the stator. In contrast, by flowing coolant through each passage in parallel, the coolant pressure drop across the stator may be significantly reduced but the thermal performance of the coolant will also be reduced. For example, the coolant will have a higher cooling effect adjacent the inlet than at other circumferential locations across the stator. The present disclosure may provide a stator and a method for balancing the pressure and the thermal requirements of stator cooling in which the pattern of flow of coolant through the stator may be modified.

In the examples shown, the stator 2 comprises an annular core 4 which extends around a stator axis X-X, the annular core 4 also extending parallel to the stator axis X-X to form a toroidal body. The core 4 in the example shown comprises a plurality of slots 6 which receive windings 8. The slots 6 extend through the annular core 4 from a first axial end 10 to a second axial end 12 thereof. In the example shown, the slots 6 extend radially inwardly from the outer circumference 14 of the annular core 4 such that the slots 6 are open at their radially outer ends but are closed at their radially inner ends. In this example, the slots 6 extend parallel to the axis X-X, but in other embodiments, they may be angled relative thereto.

The core 4 further comprises a plurality of teeth 16 formed between the slots 6 and extending from the first axial end 10 to the second axial end 12 of the core 4.

Figure 2:
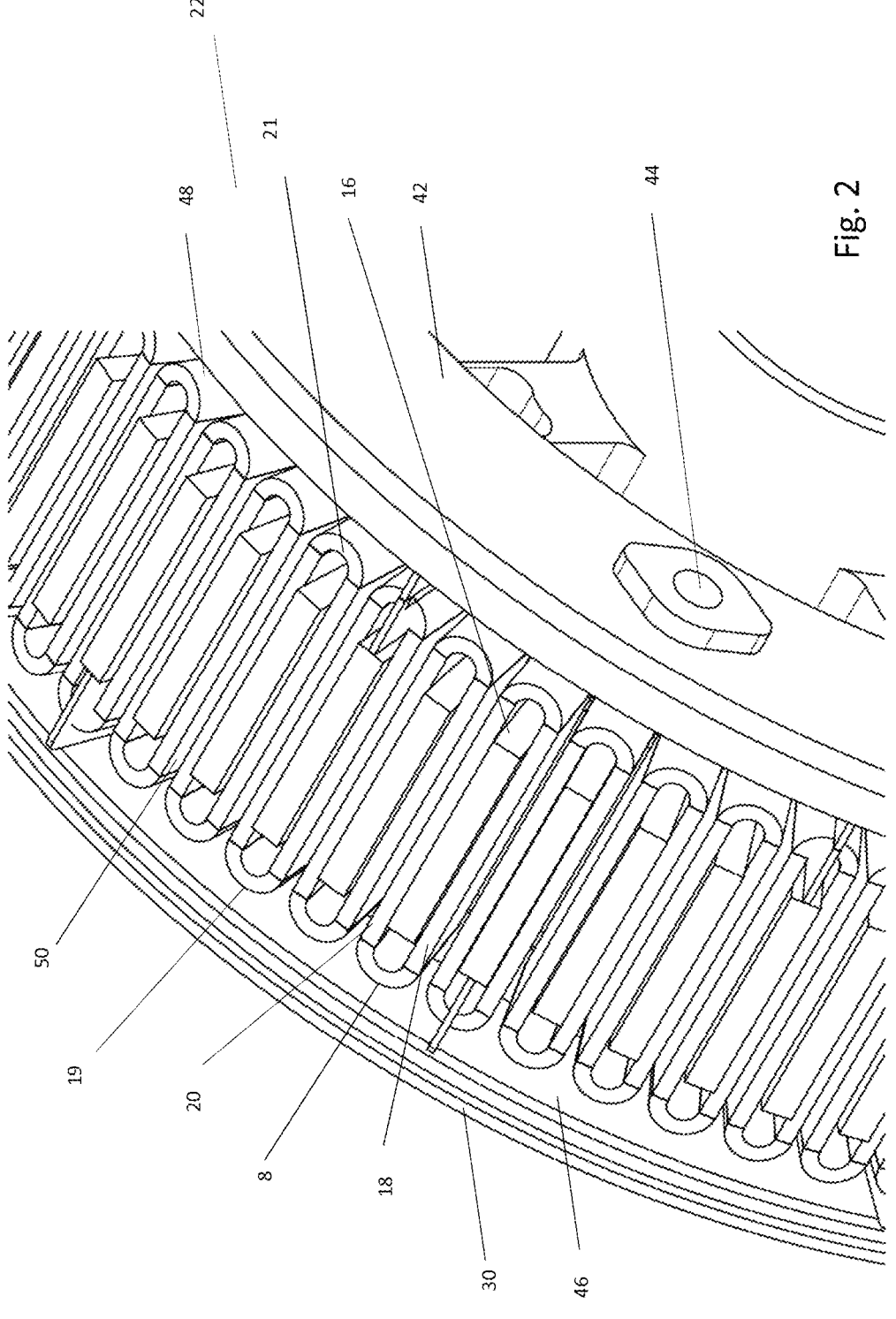
FIG. 2 is a perspective view of part of the stator of FIG. 1.

As seen more clearly in FIG. 2, stator windings 8 are formed around each of the teeth 16 such that a first portion 18 of a winding 8 extends into a first slot adjacent a first circumferential side of the tooth 16 and a second portion 20 of the winding 8 extends into a second slot adjacent a second circumferential side of the tooth 16, where the first and second slots are located on either side of the same tooth 16. Thus, the first and second portions 18, 20 of the windings 8 are joined by parts 19, 21 of the winding extending around a tooth 16 at the first and second axial ends 10, 12 of the core 4.

It will be understood that in any example of the disclosure, the dimensions of the annular core 4, the number of slots 6 and teeth 16 provided and the dimensions of the slots 6 will vary depending on the design constraints and requirements of a particular electrical machine.

In the example shown, the core 4 of the stator 2 is provided in an annular housing 22. The annular housing 22 comprises a separate component in which the core 4 is received.

As seen for example in FIG. 1, the annular housing 22 receives the core 4 such that the annular housing and the core 4 extend around the same stator axis X-X. The annular housing 22 comprises a radially inner annular base 24 which is adapted to receive the core 4 on a radially outer surface 26 thereof (as seen for example in FIG. 3). The radially inner annular base 24 has an axial length L1 which is greater than the axial length L2 of the core 4. In the example shown in FIG. 3, the annular housing 22 is formed of two parts which join together to form the annular base 24. It will be understood that in other examples, the housing could be formed as one single part or of a different number of parts if desired.

The housing 22 (in this example, the first part of the housing 22 (first housing part 28)) has a first radial wall 30 at a first axial end thereof which extends radially outwardly from an annular base 32 which forms part of the annular base 24. A fluid or coolant inlet or aperture (not shown) can be provided in the first radial wall 30 to allow fluid to flow into the housing 22 through the first radial wall 30. It will be understood that any suitable number of fluid inlets may be provided in the first radial wall 30 and may be spaced circumferentially around the annular housing 22 as desired.

At the other axial end removed from the first radial wall 30, the annular base 32 of first housing part 28 includes a radial step, the axially outer portion 34 of the annular base 32 being radially inward of the rest of the annular base 32.

The second part of the housing 22 (second housing part 36) has an annular base 38 with a radial step provided at a first axial end thereof, such that the axial end portion 40 of the annular base 38 is radially outward of the rest of the annular base 38. Thus, when assembled together, the axial end portion 40 of the annular base 38 rests over the axially outer portion 34 of the annular base 32. It will be understood that providing a housing made up of two parts as described above may allow the housing 22 to be assembled or disassembled to gain access to the core 4 and the windings therein during manufacture or for modifying a stator after manufacture thereof.

Figure 3:
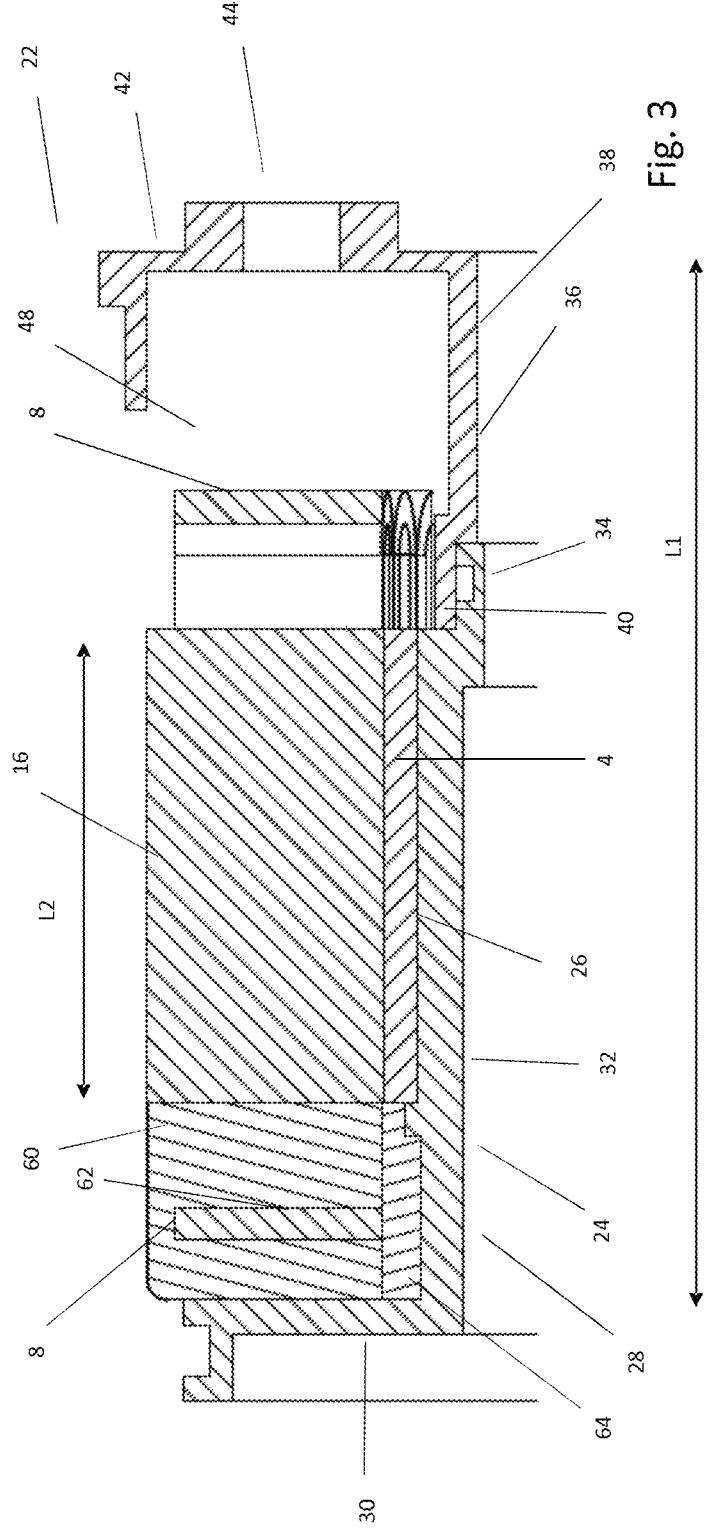
FIG. 3 is a schematic radial sectional view through a part of a stator according to the disclosure at a first circumferential location.

The housing 22 (in this example, the second housing part 36) also has a second radial wall 42 extending radially outwardly from the second axial end thereof. As seen in FIG. 3, a fluid or coolant outlet 44 or aperture can be provided in the second radial wall 42. It will be understood that any suitable number of fluid outlets 44 may be provided in the second radial wall and may be spaced circumferentially around the annular housing 22 as desired.

As seen in FIG. 3, a winding 8 extends around the tooth 6 of the core 4 and is axially spaced from either axial end of the tooth 6. A first circumferential flow channel 46 (see FIG. 2) is formed between the core 4 and the first radial wall 30 at the first axial end of the housing 22. A second circumferential flow channel 48 is formed between the core 4 and the second radial wall 42 at the second axial end of the housing 22. It will be understood that a gap is provided between each circumferentially adjacent winding 8 in the stator 2 and that these gaps form respective passages 50 extending between each circumferentially adjacent winding 8 in the stator 2. The first and second circumferential flow channels 46, 48 are in fluid communication with each passage 50 as may be seen for example in FIG. 2.

In the example of FIGS. 3 to 7, the core 4 and the teeth 6 are shown hatched differently, for example because they are machined or case from different components and then joined together. It will be understood however that in any example of the disclosure, the core 4 and the teeth 6 may be formed as an integral component and/or may be formed from the same material.

In the example shown, the passages 50 extend in an axial direction along the windings 8, extending across the stator roughly perpendicular to the circumferential direction (where roughly means with 5° of perpendicular). It will be understood however that in other examples, the windings 8 and or the teeth 6 may be positioned such that the passages extend in a non-axial direction across the stator, for example at an angle of between 10° and 80° to the axial direction.

Figure 4:
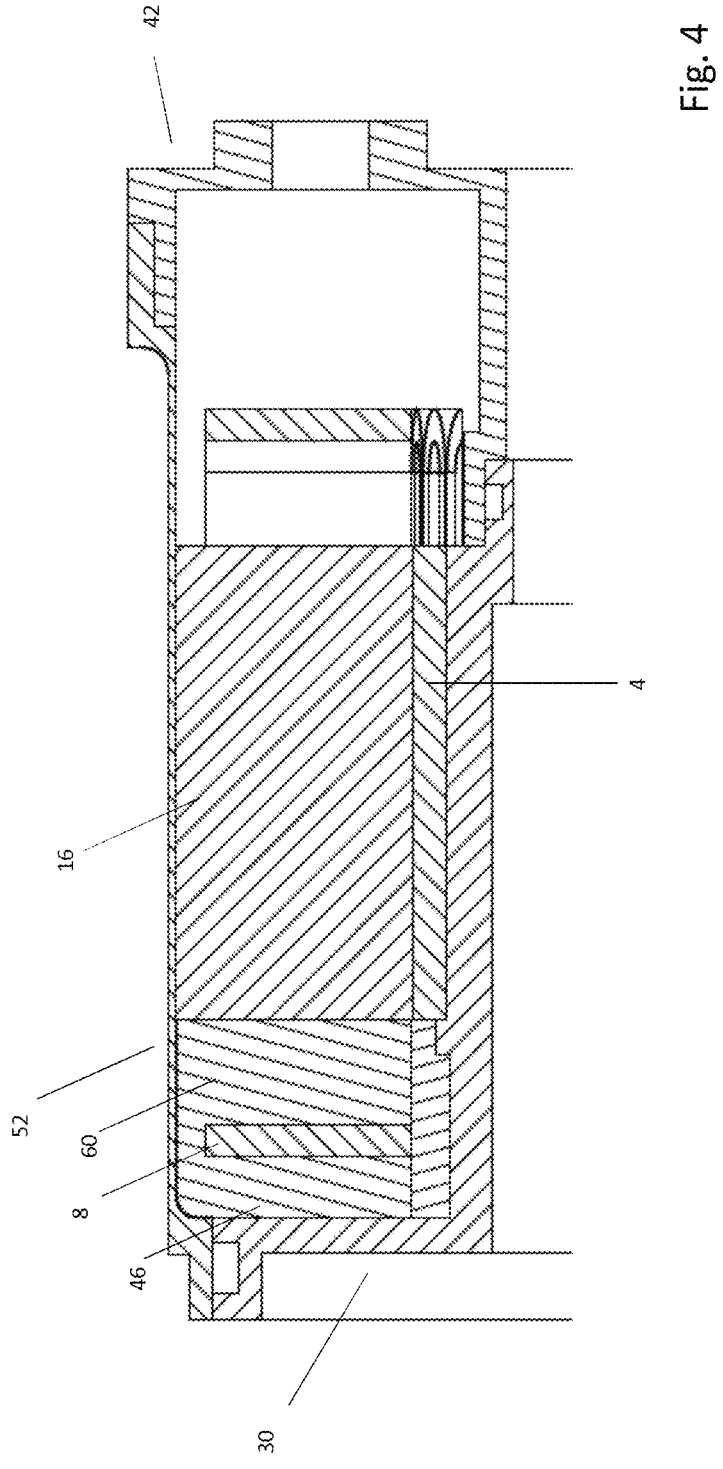
FIG. 4 is a schematic radial sectional view corresponding to FIG. 3, with a cover included.

As seen in FIG. 4, the housing 22 further includes a cover 52 which is configured to be joined with the first radial wall 30 and the second radial wall 42 so as to extend across the radially outer surface of the stator and to seal the housing 22 to avoid leakage of fluid out of the housing 22.

To provide for cooling of the windings 8 in the stator 2, a coolant fluid such as oil may be flowed through the stator 2 and along the passages 50 between the windings 8. In the example shown, fluid may flow into the first circumferential flow channel 46 through the one or more openings (not shown).

The first circumferential flow channel 46 is closed to flow at a first circumferential location (in the example shown, at a plurality of first circumferential locations) and the second circumferential flow channel 48 is closed to flow at a second circumferential location (in the example shown, at a plurality of second circumferential locations). Each second circumferential location is circumferentially spaced or removed from each first circumferential location so as to form a plurality of first sets of passages connected in parallel and a plurality of second, separate sets of passages connected in parallel, each first set of passages being circumferentially adjacent to a second set of passages. It will be understood that each first set of passages will extend between a first circumferential location and a second circumferential location. Each second set of passages will extend between a second circumferential location and a first circumferential location. Thus, when fluid or coolant flows into the first circumferential flow channel 46, the fluid will flow along the first circumferential flow channel 46 to a first circumferential location at which the first circumferential flow channel 46 is closed to flow. The fluid will therefore flow through each passage of a first set of passages from the first circumferential flow channel to the second circumferential flow channel. The fluid will then flow along the second circumferential flow channel to a second circumferential location at which the second circumferential flow channel 48 is closed to flow and the fluid will flow through each passage of the second set of passages, from the second circumferential flow channel 48 to the first circumferential flow channel 46.

Figure 5:
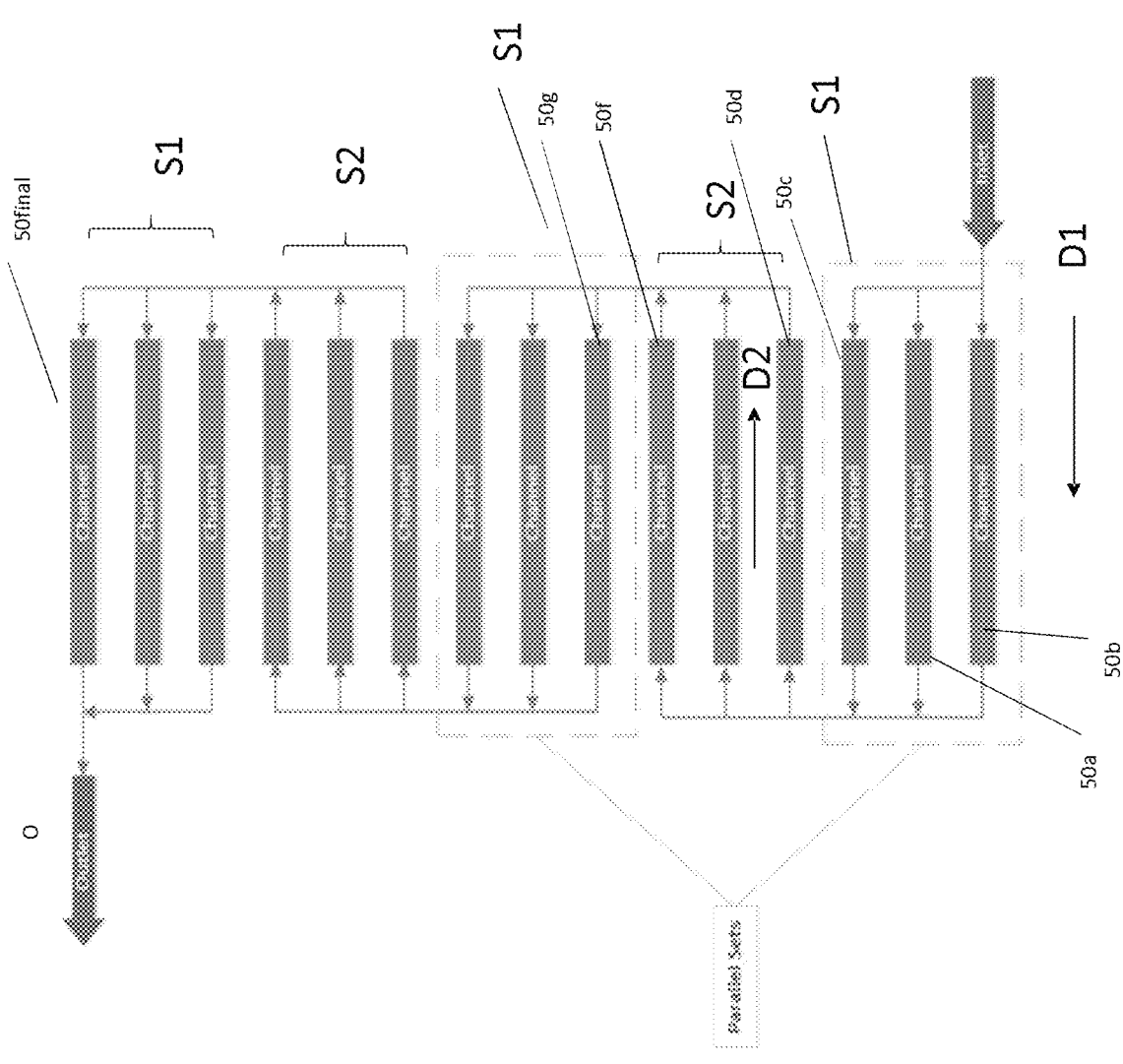
FIG. 5 is a schematic diagram showing an arrangement of flow through flow passages in a stator according to an example of the disclosure.

A possible example flow arrangement according to the disclosure is shown in FIG. 5. As seen, fluid or coolant may flow into the first circumferential flow channel 46 through an inlet I (corresponding to an inlet aperture in the first radial wall 30 for example). In the example of FIG. 5, the first circumferential flow channel 46 is closed to flow at a first circumferential location located between the third 50c and fourth 50d cooling passages in the direction of circumferential flow from the inlet. Thus, a first set S1 of 3 passages connected in parallel is formed such that fluid will therefore flow through each of the three passages (50a-50c) of the first set of three passages S1 in a first axial direction D1 from the first circumferential flow channel (not seen in FIG. 5) to the second circumferential flow channel (not seen in FIG. 5).

As seen in FIG. 5, the second circumferential flow channel 48 is closed to flow at a second circumferential location located between the sixth 50f and seventh 50g passages in the direction of circumferential flow from the inlet I. Thus, a second set S2 of three passages connected in parallel is formed adjacent to the first set of passages S1 such that fluid will therefore flow through each of the three passages 50d-50f (the fourth, fifth and sixth passages shown) of the second set of three passages S2 from the second circumferential flow channel (not seen in FIG. 5) to the first circumferential flow channel (not seen in FIG. 5) in a second axial direction D2.

In the example of FIG. 5, the pattern repeats itself such that sets of three passages 50 are provided for parallel flow of fluid in alternating directions. This is achieved by closing the first circumferential flow channel 46 to flow at a number of first circumferential locations located between the third and fourth passages, the ninth and tenth passages and so on in the direction of circumferential flow from the inlet. The second circumferential flow channel 48 is also closed to flow at a number of second circumferential locations located between the sixth and seventh passages, the twelfth and thirteenth passages and so on in the direction of circumferential flow from the inlet I. In the example of FIG. 5, the stator is configured to include three first sets S1 of passages for flow in the first axial direction D1 which alternate with two second sets S2 of passages for flow in the second axial direction D2. An outlet O for fluid to flow out of the second circumferential flow channel 48 can be provided adjacent the final passage 50 final of the third first set S1 of passages comprising the thirteenth, fourteenth and fifteenth passages.

It will be appreciated that the arrangement shown in FIG. 5 is only one possible configuration and that the number of passages in each of the first and second sets of passages can be varied as required. Thus, each set of passages could include any number of passages from two to a much higher number such as for example, ten. Further, each set of passages could contain a different number of passages from the other sets if required.

In some examples of the disclosure, the first and second circumferential flow channels 46, 48 may be closed to flow by permanent structures which are put into place when the stator 2 is manufactured and which cannot subsequently be moved or altered. In one such example, the housing 22 may be formed to include structure such as walls which act to close the first and second circumferential flow channels 46, 48 to flow at the relevant circumferential locations.

In other examples of the disclosure, the first and second circumferential flow channels 46, 48 may be closed to flow by inserts which can be used to close the first and second circumferential flow channels 46, 48 to flow at any desired circumferential location and which may be removed or moved to different circumferential locations so as to change the flow pattern of coolant within the stator as desired.

An insert 60 is shown in situ in the first circumferential flow channel 46 in FIGS. 3 and 4. The insert 60 comprises a sheet made of a non-electrically conductive material such as a ceramic. The ceramic material will act to absorb heat from the winding 8, thus improving the cooling of the winding 8. However, in other examples, the insert 60 could be made of plastic. The sheet is sufficiently rigid to maintain its shape in use and is shaped to provide a fluid-tight fit or a close fit when inserted between the first radial wall 30 of the housing 22 and the core 4. The insert 60, as shown in FIG. 8, further comprises a cut-out portion 62 configured to extend around and over the winding 8. In some examples, the insert 60 could be configured to extend to the annular base 24 of the housing 22. In the example of FIG. 3 however, a protrusion 64 is formed on the annular base 24 of the housing 22 extending radially outwardly therefrom and the insert 60 is configured to extend to and engage with the protrusion 64.

In some examples, the protrusion 64 may be a part of the housing, for example having been formed by being machined into the housing. In other examples, the protrusion 64 may comprise a separate insert, for example formed from ceramic or plastic. In these examples, the protrusion may be configured to rest in a retaining groove (not shown) formed in the housing. If desired, the protrusion may further be bonded into place adjacent the housing or in the retaining groove. To provide good engagement between the protrusion 64 and the insert 60, the protrusion 64 and the insert 60 may be designed with "tongue and groove" type mating features.

The insert 60 may be sufficient to seal against fluid flow along the first circumferential flow passage 46 as the fluid is likely to take the easiest path as provided by the passages 50. Further, if desired, a rough surface may be provided on the insert 60, for example although not exclusively around the cut out portion 62, for contact with the winding 8 so as to improve the seal provided between the insert 60 and the winding 8.

If required, to further improve the seal provided by the insert 60, a sealant such as a high temperature sealant (for example EP3500 or another high temperature epoxy) could be placed between the insert 60 and the winding 8 over which it extends. Further sealant may also be provided between the insert 60 and the radial wall 30, and/or between the insert 60 and the core 4, and/or between the insert 60 and the annular base 24 or the protrusion 64, and/or between the insert 60 and the cover 52.

Figure 6:
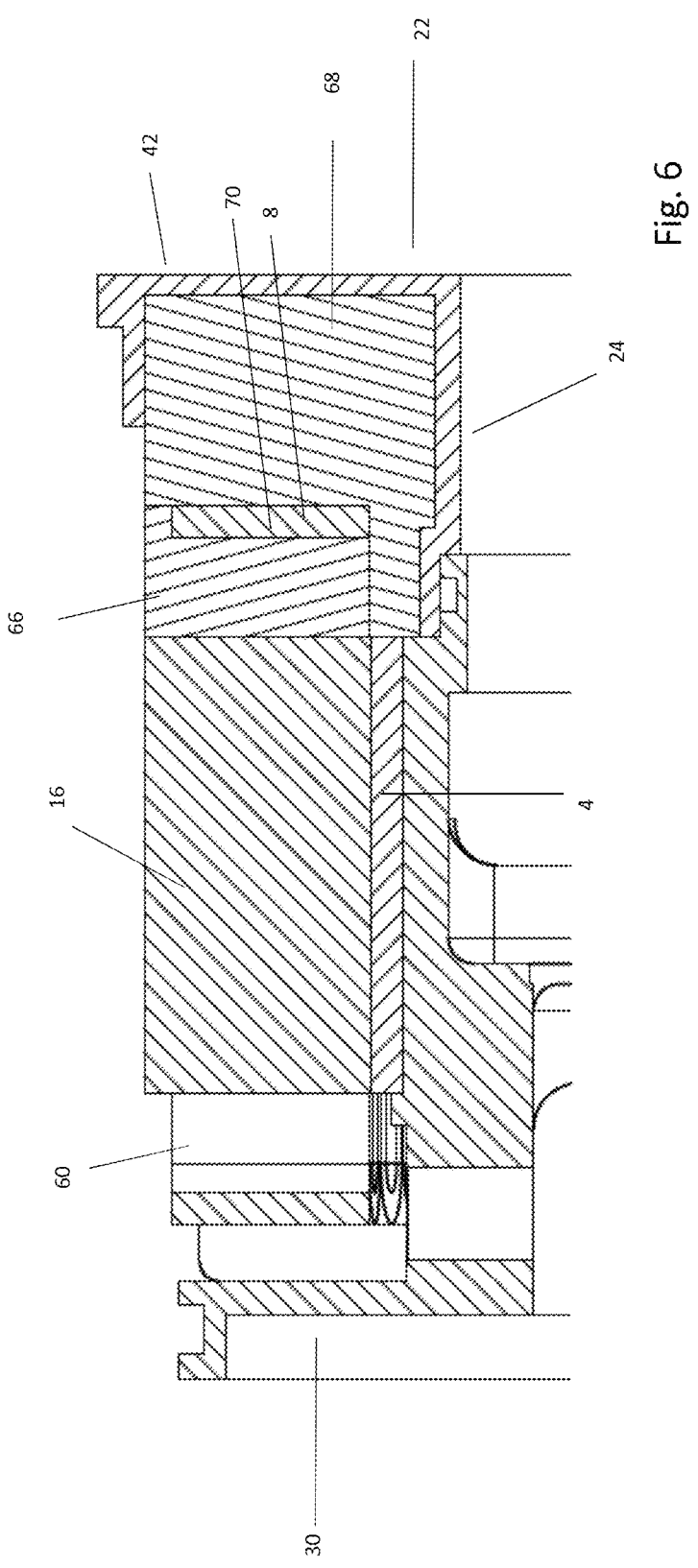
FIG. 6 is a schematic radial sectional view through a part of a stator according to the disclosure at a second circumferential location.
Figure 7:
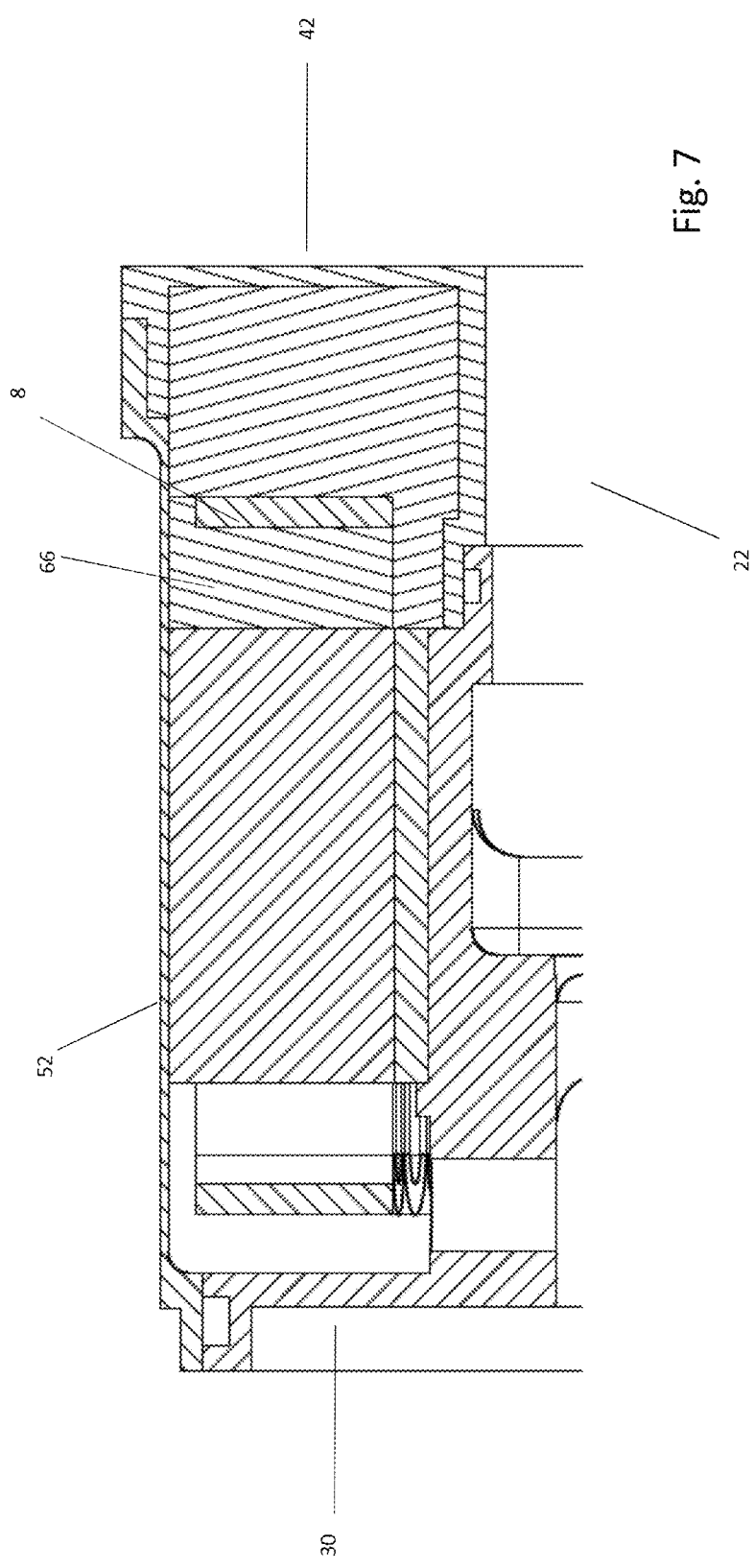
FIG. 7 is a schematic radial sectional view corresponding to FIG. 6, with a cover included.

An alternative sealing arrangement for closing the second circumferential flow channel 48 to flow is shown in FIGS. 6 and 7. As seen in FIG. 6, this shows a section through a stator 2 according to the disclosure at a second circumferential location, different to the circumferential location at which the section of FIG. 3 is taken. The housing 22 is the same as shown in FIG. 3 and so the same reference numbers for equivalent parts are used in FIGS. 6 and 7. In FIG. 6, a second insert 66 is shown in situ in the second circumferential flow channel 48. The second insert 66 comprises a sheet made of a non-electrically conductive material such as a ceramic. The ceramic material will act to absorb heat from the winding 8, thus improving the cooling of the windings. However, in other examples, the second insert 66 could be made of plastic. The sheet is sufficiently rigid to maintain its shape in use.

Figure 8B:
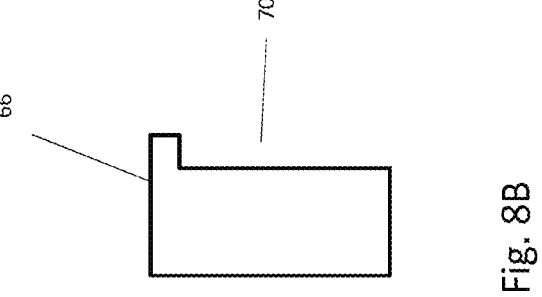
FIG. 8B is a radial sectional view through a second insert for a stator according to an example of the disclosure.
Figure 8A:
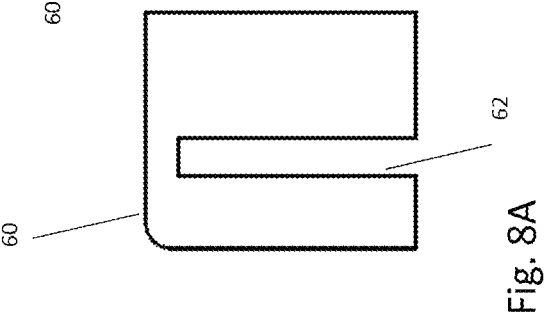
FIG. 8A is a radial sectional view through a first insert for a stator according to an example of the disclosure.

The second insert 66 is also shown in FIG. 8B. In some examples, the second insert 66 could be configured to extend to the annular base 24 of the housing 22 and between the core 4 and the second radial wall 42 of the housing. In the example of FIG. 6 however, a further protrusion 68 is formed on the annular base 24 of the housing 22 extending radially outwardly therefrom.

In some examples, the further protrusion 68 may be a part of the housing 22, for example having been formed by being machined into the housing. In other examples, the further protrusion 68 may comprise a separate insert, for example formed from ceramic or plastic. In these examples, the protrusion may be configured to rest in a retaining groove (not shown) formed in the housing 22. If desired, the protrusion may further be bonded into place adjacent the housing or in the retaining groove. To provide good engagement between the protrusion 64 and the insert 60, the protrusion 64 and the insert 60 may be designed with "tongue and groove" type mating features.

The further protrusion 68 is configured to extend radially internally of the winding 8 from the core 4 and to support the winding 8. It is further configured to extend radially outwardly from the outer axial end of the winding and is configured to abut against the winding 8 in the radial direction. The second insert 66 is configured to extend to and engage with the further protrusion 68 and is shaped to provide a tight fit when inserted between the further protrusion 68 of the housing 22 and the core 4. The second insert 66 further comprises a cut-out portion 70 configured to extend over the winding 8.

The second insert 66 may be sufficient to seal against fluid flow along the second circumferential flow passage 48 as the fluid is likely to take the easiest path as provided by the passages 50. Further, if desired, a rough surface may be provided on the second insert 66 for contact with the winding 8, for example around the cut-out portion 70, so as to improve the seal provided between the second insert 66 and the winding 8. If required, to further improve the seal provided by the second insert 66, a sealant such as a high temperature sealant (for example EP3500 or another high temperature epoxy) could be placed between the second insert 66 and the winding 8 over which it extends. Further sealant may also be provided between the second insert 66 and the second radial wall 42, and/or between the second insert 66 and the core 4, and/or between the second insert 66 and the annular base 24 or the further protrusion 68, and/or between the second insert 66 and the cover 52.

It will be understood that by using sealant between any insert, such as for example a first insert 60 or a second insert 66 as described above, and the other parts, the dimensions of the insert may become less critical and that any gaps between the insert and surrounding components may be filled with sealant as required.

In the examples described above and shown in FIGS. 3, 4, 6 and 7, the inserts 60, 66 are configured to block or limit circumferential flow at a circumferential location corresponding to an axially outermost or innermost part of a winding 8, i.e. where the winding 8 extends circumferentially whilst turning from a first radial direction to a second radial direction. Thus, the first and second inserts 60, 66 are configured to join with the parts 19, 21 of the winding 8 extending around a tooth 16 at the first and second axial ends 10, 12 of the core 4.

It will be understood that any desired number of first and second inserts 60, 66 could be provided within a stator 2 to provide a desired coolant flow pattern within the stator. Further, the inserts can be removed or moved to alternative circumferential locations and further inserts can be added as required such that a coolant flow pattern within a stator can be modified during the stator's lifetime using the inserts of the disclosure. It will be appreciated that the insertion and removal of the inserts may be facilitated by the housing structure comprising a separate cover 52 and by the housing being formed in two separate parts.

Further, the stator of the example of FIG. 1 is a radially inner stator, that is it is configured for a rotor to extend radially outwardly from the stator. However, the disclosure applies equally to a radially outer stator. In any example of a radially outer stator, the housing and the core may be radially inverted such that the inserts may be inserted into the stator from a radially inner side thereof.

In any example of a stator for an electric motor according to the disclosure, the windings 10 may comprise copper Litz windings or shaped bundles of conductors such as copper wire. These may be stacked radially one above the other and be positioned within slots in the stator body as described above.

A method of assembling a stator according to the disclosure will now be described with reference to the example of FIGS. 1 to 7.

The method of assembling a stator according to the disclosure includes first assembling conductive windings 8 on the annular core 4. The conductive windings 8 may comprise Litz windings or other wire windings wound around the teeth 16 of the stator 2. In this example, the windings 8 are formed with a radial gap extending there between to form passages 50 as described above.

The core 4 may then be placed into a housing 22 by assembling the two housing parts 28, 36 around the core 4.

A first insert 60 can then be inserted into the first circumferential flow passage 46 to extend over a winding 8, which may be positioned in circumferential alignment with the outlet aperture 44. Further first inserts 60 can then be inserted into the first circumferential flow passage 46 to extend over a number of circumferentially spaced windings

8. To achieve the configuration, shown in FIG. 5, the first inserts can be positioned over every sixth winding 8 after the first winding in alignment with the outlet aperture.

Second inserts 66 may also be inserted into the second circumferential flow passage 48 to extend over a number of circumferentially spaced windings 8 which are circumferentially offsets from the first inserts 60. To achieve the configuration, shown in FIG. 5, the second inserts can be positioned over the third winding 8 after the first winding in alignment with the outlet aperture and then over each sixth subsequent winding 8.

If required, a sealant of the type described above may be placed around the relevant surfaces of the first and second inserts 60, 66 before or after they are inserted into the stator.

The housing cover 52 may then be placed over the housing 22 so as to close the first and second circumferential flow channels 46, 48 and the passages 50.

When in-situ in the stator, the first and second inserts 60, 66 are configured to block or limit flow of coolant along the first and second circumferential flow channels 46, 48 as will be described in further detail below.

A method of cooling a stator 2 in an electrical machine is disclosed in which a cooling fluid such as oil is flowed along the first and second circumferential flow channels 46, 48 and through the passages 50 formed between the windings 8 in the stator. It will be appreciated that by varying the number and circumferential locations of the first and second inserts 60, 66 described above, the pattern of flow through the passages 50 can be controlled. Thus, the volume and velocity of oil flowing through the passages 50 and the pressure drop in the oil flowing across the stator 2 from an inlet I to an outlet O can be controlled so as to improve cooling of the stator windings 8.

Although not shown in the drawings, it will be understood that a stator having any combination of the features described and shown in the accompanying drawings could be provided.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of disclosure. Additionally, while various examples of the disclosure have been described, it is to be understood that aspects of the disclosure may include only some of the described examples. Accordingly the disclosure is not to be seen as limited by the foregoing description, but is only limited by the scope of the appended claims.

The invention claimed is:

1. A stator for an electrical machine, the stator comprising:
   an annular housing extending around a central axis;
   a first circumferential flow channel extending around the housing;
   a second circumferential flow channel axially spaced from the first circumferential flow channel and extending around the housing; and
   a plurality of windings;
   wherein the plurality of windings are circumferentially spaced about the housing to form a passage between each two adjacent windings;
   wherein each passage is in fluid communication with both the first circumferential flow channel and the second circumferential flow channel;

wherein the first circumferential flow channel is closed to flow at a first circumferential location and the second circumferential flow channel is closed to flow at a second circumferential location, removed from the first circumferential location so as to form a first set of passages connected in parallel and a second, separate set of passages connected in parallel; and wherein the stator is configured such that coolant flows through the first set of passages from the first circumferential flow channel to the second circumferential flow channel and then flows from the second circumferential flow channel through the second set of passages to the first circumferential flow channel;

the stator further comprising:

a first insert configured to close the first circumferential flow channel to flow at the first circumferential location; and a second insert configured to close the second circumferential flow channel to flow at the second circumferential location.

2. The stator as claimed in claim 1, wherein the first circumferential flow channel is closed to flow at a plurality of first circumferential locations or second circumferential flow channel is closed to flow at a plurality of the second circumferential locations so as to form one or a plurality of first sets of passages connected in parallel which alternate with one or a plurality of second, separate sets of passages connected in parallel.

3. The stator as claimed in claim 1, further comprising:
   a plurality of teeth, each winding extending around a respective tooth.

4. The stator as claimed in claim 1, wherein each first set of passages comprises three passages connected in parallel and each second, separate set of passages comprises three passages connected in parallel.

5. An electrical machine comprising the stator as claimed in claim 1.

6. The stator as claimed in claim 1, further comprising:
   a core.

7. The stator as claimed in claim 6, the core comprises:
   an annular body extending around the central axis and received within the housing; or
   the plurality of teeth extend radially outwardly or inwardly from the annular body; or
   the plurality of teeth form part of the core; or
   the first circumferential flow channel extends between a first axial end of the core and the housing; or
   the second circumferential flow channel extends between a second, opposite axial end of the core and the housing.

8. The stator as claimed in claim 1, wherein the first or second insert is configured to engage with a respective winding.

9. The stator as claimed in claim 8, wherein the first and or second insert includes a rough surface for improved sealing engagement with the winding.

10. The stator as claimed in claim 9, wherein a sealant is provided between the first or second insert and the respective winding.

11. A method of cooling a stator, the method comprising:
   flowing coolant through first and second set(s) of passage(s) in the stator;
   wherein the stator includes:
   an annular housing extending around a central axis;
   a first circumferential flow channel extending around the housing;

a second circumferential flow channel axially spaced from the first circumferential flow channel and extending around the housing; and a plurality of windings;

wherein the plurality of windings are circumferentially spaced about the housing to form a passage between each two adjacent windings;

wherein each passage is in fluid communication with both the first circumferential flow channel and the second circumferential flow channel;

wherein the first circumferential flow channel is closed to flow at a first circumferential location and the second circumferential flow channel is closed to flow at a second circumferential location, removed from the first circumferential location, so as to form the first set of passages connected in parallel and the second, separate set of passages connected in parallel; and wherein the stator is configured such that coolant flows through the first set of passages from the first circumferential flow channel to the second circumferential flow channel and then flows from the second circumferential flow channel through the second set of passages to the first circumferential flow channel;

the stator further comprising:

a first insert configured to close the first circumferential flow channel to flow at the first circumferential location; and a second insert configured to close the second circumferential flow channel to flow at the second circumferential location.

12. A method of cooling a stator as claimed in claim 11, further comprising flowing the coolant into the first circumferential flow channel before flowing the coolant through the first and second set(s) of passage(s).

* * * * *